United States Patent

[11] 3,566,106

| | | | |
|---|---|---|---|
| [72] | Inventor | Taylor C. Fletcher |
| | | Orange, Calif. |
| [21] | Appl. No. | 789,096 |
| [22] | Filed | Jan. 2, 1969 |
| [45] | Patented | Feb. 23, 1971 |
| [73] | Assignee | the United States of America as represented by the Secretary of the Navy |

[54] NONMICROPHONIC INFRARED GAS ANALYZER
3 Claims, 4 Drawing Figs.

[52] U.S. Cl.............................................. 250/43.5, 250/83.3
[51] Int. Cl............................................... G01n 21/26
[50] Field of Search.................................. 250/43.5, 83.31 (R)

[56] References Cited
UNITED STATES PATENTS

| 2,709,751 | 5/1955 | Meyer............................ | 250/43.5 |
|---|---|---|---|
| 3,234,380 | 2/1966 | Liston et al.................... | 250/43.5 |

*Primary Examiner*—Archie R. Borchelt
*Assistant Examiner*—A. L. Birch
*Attorneys*—Louis A. Miller, Louis B. Applebaum and Arthur L. Bowers

ABSTRACT: In an infrared analyzer cell having at least two pockets of the same gas separated by a very thin sensitive diaphragm, an electrical element adjacent to the diaphragm and fixed to the cell housing to function with the diaphragm as a capacitor, a slow leak path between the pockets to preclude static pressure differential across the diaphragm, an infrared window for transmitting energy in a predetermined energy band in the infrared portion of the spectrum to one of the gas pockets, the centroids of the two gas pockets being contiguous to minimize deflection of the diaphragm relative to the pockets of gas with vibration of the cell.

INVENTOR.
TAYLOR C. FLETCHER

INVENTOR.
TAYLOR C. FLETCHER

NONMICROPHONIC INFRARED GAS ANALYZER

The invention described herein may be manufactured and used by or for the Government of the United States of America for governmental purposes without the payment of any royalties thereon or therefor.

CO, NO, NO$_2$, CH$_4$, SO$_2$ and many other gaseous or vaporous substances can be detected in the atmosphere if present in significant concentration by known infrared techniques; also the concentration of the substance can be approximated by these techniques. Each of these substances absorbs radiant energy in a narrow frequency band segment from incident broadband infrared energy. The narrow frequency band for each of these gaseous or vaporous substances is the characteristic absorption spectra of the substance. Attenuation of the narrow frequency band is related to the quantity of the compound in the path of the energy which in turn is related to concentration of the substance along that path length of the energy.

A type of pneumatic detector cell which operates on the principles of the gas calorimeter is used for this purpose for detecting one selected substance. To monitor for several substances, a corresponding number of cells are used. Each cell is a container filled with either the particular gaseous or vaporous substance to be detected by that cell or any gas or combination of gases which have absorption spectra that overlap the characteristic absorption spectrum of the substance to be detected, a very thin sensitive diaphragm across the gas filled chamber and dividing the chamber, a slow leak path across the diaphragm to prevent buildup of static pressure across the diaphragm, an infrared window for directing incident energy to the gaseous substance on one side of the diaphragm, and any means to detect displacement of the diaphragm. Another cell having the same basic elements is supported in optical tandem with the other cell so that all the infrared radiant energy admitted to the first cell and not absorbed by the gas in the first cell is delivered to the second cell. The second cell contains a different gaseous substance or one which may even be the same gas as in the first cell. The second cell must be different in its response than the first cell since it sees a different spectrum than the first cell because of the partial absorption in the first cell.

Energy from a distant neutral background such as a hill, a wall, or the horizon is focused on the cell. If the gaseous substance of interest is present along the atmospheric path between the neutral background and the detector and is cooler than the neutral background, the intensity of the background blackbody radiance is attenuated in the narrow frequency band identified with the gaseous substance of interest. In the first cell of the cell pair wherein the absorption spectra of the contained gaseous substance matches the absorption spectra of gaseous substance of interest, less energy is available from incident radiation for absorption by the gaseous substance in the first cell than is available for absorption by the gaseous substance in the reference cell presuming that at the energy source the two narrow band spectra have approximately the same intensity. The capacitive changes in the two cells are compared. The detector is operable whether the background is warmer or cooler than the gaseous compound of interest. A detector embodying these principles of operation is disclosed in U.S. Pat. No. 3,234,380. A detector having one single cell rather than two cells as described above are useful for detecting change of intensity in a selected band.

It was discovered that this type of detector, if used on a ship, land, or airborne vehicle in motion, that sufficient microphonism resulted to virtually mask the signal.

An object of this invention is to provide a long path infrared detector operable on the principles described for mobile applications wherein microphonism is minimized.

Other objects, advantages and novel features of the invention will become apparent from the following detailed description of the invention when considered in conjunction with the accompanying drawings wherein.

Figure 1:
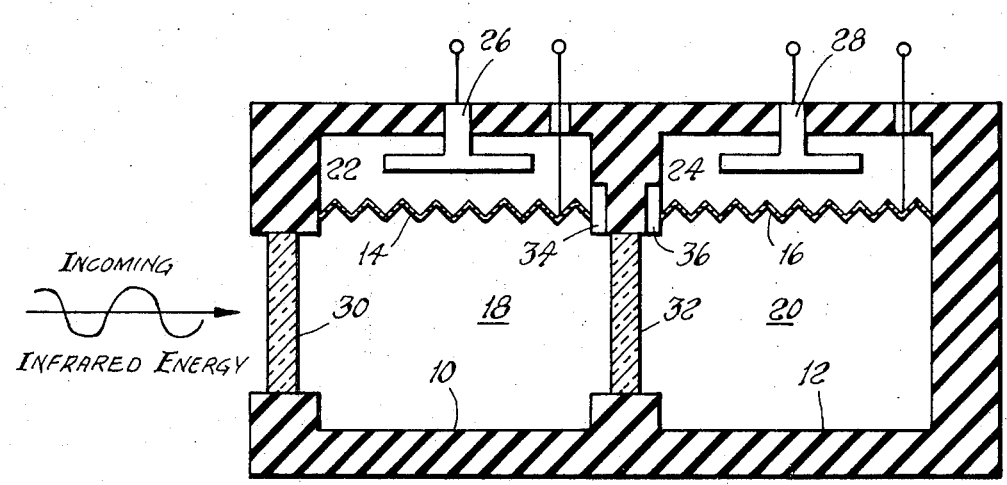
FIG. 1 is a functional diagram of a type of prior art infrared detector to which the teachings of this invention may be applied.

The functional diagram in FIG. 1 of a prior art detector construction includes two substantially identical housings 10 and 12, integrally joined, in line and shown of electrically insulating material for simplicity. Housing 10 contains the sample detecting section and housing 12 contains a reference section. Housing 10 is charged with a gaseous substance identical to the substance to be detected or a gaseous substance or combination of substances having an infrared absorption band that is the same as or overlaps the characteristic infrared absorption band of the gaseous substance to be detected. Similarly, housing 12 is charged with a gaseous substance for comparative reference. Very thin sensitive diaphragms 14 and 16 partition the respective housings into active volumes 18 and 20 and back volumes 22 and 24. A diaphragm displacement sensing means, e.g. electrode 26 is supported by the housing 10 contiguous the diaphragm 14 to function therewith as a capacitive impedance. Similarly, an electrode 28 is supported by the housing 12 contiguous with a diaphragm 14 for the same purposes. The housings have infrared windows 30 and 32 that are in line for transmitting incident infrared energy to the active volumes 18 and 20 in succession. Slow leak passages 34 and 36 bridge the respective diaphragms to prevent development of static pressure differential across the thin sensitive diaphragms that could damage or rupture the sensitive diaphragms.

The pneumatic detector shown in FIG. 1 is a spectrally selective infrared sensing device wherein sample detecting section 10 in tandem with reference section 12 view incoming infrared energy simultaneously. The windows 30 and 32 transmit the infrared spectrum of interest. When infrared energy enters the detector the gaseous substances in the respective sections absorb energy from their characteristic spectral bands causing the respective gaseous substances to increase in temperature. The diaphragms in the respective sections allow the active volumes 18 and 20 of the respective gaseous substances to expand in response to absorbed energy. The displacement of each diaphragm is detected as a change in capacitance. Since static pressure buildup across each diaphragm is prevented by the slow leak paths across the diaphragms, each diaphragm moves only in response to changing or intensity modulated incoming infrared energy. Under conditions of decreasing incoming energy in the absorption band of the gaseous substance in the container 10, the temperature of the active volume 18 is decreased, and the diaphragm is displaced in the direction away from the electrode 26, indicating the presence of the gaseous substance of interest along the optical path. This type of detector proved to be unsuitable for mobile applications due to microphonism.

Figure 2:
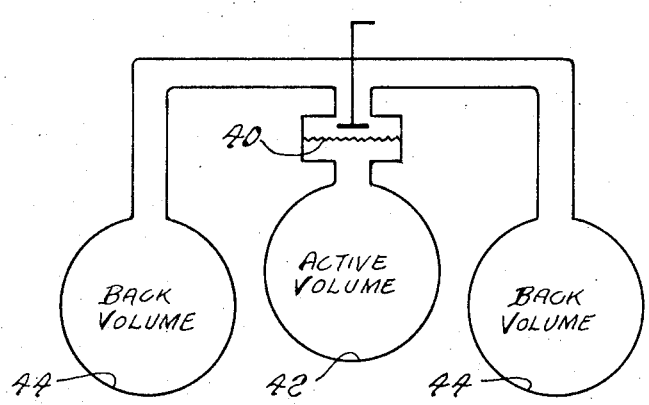
FIG. 2 is a schematic showing of the basic aspects of this invention.

This invention is illustrated schematically in FIG. 2. The showing relates to one cell. For a two cell structure as in FIG. 1, the showing of FIG. 2 is duplicated in tandem. The diaphragm 40 separates active and back volumes 42 and 44. The windows, not shown in FIG. 2, transmit energy normal to the plane of the paper to the active volumes of two cells in tandem. One significant feature is that the back volume 44 and the active volume are on the same side of the diaphragm. A second significant feature is that the back volume is in at least two parts, one on either side of the active volume. The purpose of both of these features is to locate the centroids of the active and back volumes at substantially the same point. Ideally, if the diaphragm were weightless and the centroids were located at the same point, microphonism would be essentially eliminated; though the centroids and housing would oscillate relative to one another when the housing is oscillated, the two centroids would continue in coincidence exerting no force on the diaphragm; a weightless diaphragm and the electrode would move with the container whereby the spacing between them would remain constant. Using a low weight diaphragm and locating centroids at the same point substantially reduces the problem of microphonism.

Actually in a structural configuration as in FIG. 2, there is a second order effect due to the mass of the diaphragm. The displacement between the diaphragm and the back volume centroid is slightly greater than the displacement between the diaphragm and the active volume centroid when there is oscillation normal to the diaphragm. Under acceleration normal to the diaphragm, the diaphragm tends to be displaced relative to the housing in the same direction as the centroid of the gas in the active volume. Thus, the centroid of 42 must be closer to the diaphragm 40 than the centroid of 44. If the spacing of the centroids multiplied by the density of the gas is made equal to mass per unit area of the diaphragm the effect is obviated. The centroids are spaced along the Y axis only, i.e. normal to the diaphragm; they are coincident along the X and Z axes.

Figure 3:
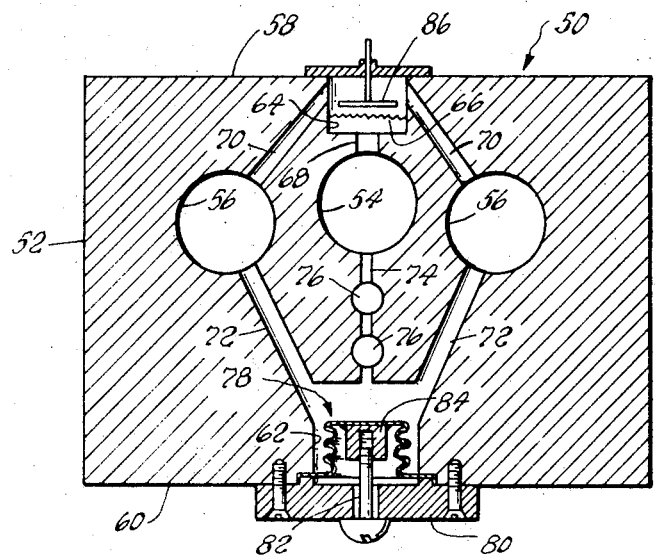
FIG. 3 is a cross section of embodiment of the invention for a single cell.

The detector cell 50 shown in FIG. 3 embodies the principles of the functional diagram of FIG. 2. The cell comprises a housing 52 formed with a cylindrical active volume chamber 54 and a pair of cylindrical back volume chambers 56, in parallel but not coplanar; the back volume centroid is slightly below the active volume centroid. Opposite faces 58 and 60 are formed with recesses 62 and 64, having a common axis that intersects the axis of the active volume chamber 54. A thin lightweight sensitive diaphragm 66 is mounted in the recess 64 normal to the axis of recesses 62 and 64 and in sealed relationship to the sidewalls. A passage 68 in the housing between the active volume chamber 54 and the recess 64 continuously equalizes pressure in the active volume chamber 54 and in the near part of the recess 64. Passages 70 in the housing extend between the back volume chambers 56 and the recess 64 and continuously equalize pressure in the back volume chambers 56 and the remote part of the recess 64. Passages 72 in housing 52 extend between the back volume chambers 56 and the recess 62 and also continuously equalize pressure in the back volume chambers 56. A slow leak passage 74 in the housing extends between the active volume chamber 54 and the back volume. Slow leak passage 74 is of capillary size with at least one intermediate segment 76 that is larger for establishing a time constant for response when there is a pressure differential thereacross. The slow leak passage 74 prevents development of static pressure differential across the diaphragm and does not transmit force between the active volume and the back volume that is due to dynamic pressure differential.

The recess 62 is essentially direct coupled to the back volume chambers 56 whereby the back volume centroid includes the free volume of recess 62. A volume adjustment assembly 78 is mounted in the recess coaxial with the recesses 62 and 64 to enable adjustment of the centroid of the back volumes relative to the centroid of the active volume to compensate for variations in the mass per unit area of the diaphragm, dimensional and other parameter inaccuracies. The volume adjustment assembly 78 includes a bellows carried by a plate 80 secured to the face 60 of the housing. An adjusting screw 82 extends through the plate 80 and is threaded into a block 84 to permit the bellows to expand to force the bellows to contract against spring bias.

A rigid electrode 86 is fixedly supported in the recess 64 close to the diaphragm. Electrical connections are brought out from the diaphragm and electrode whereby displacement of the diaphragm may be measured in terms of change of capacitive impedance. Any means of detecting displacement may be used.

Figure 4:
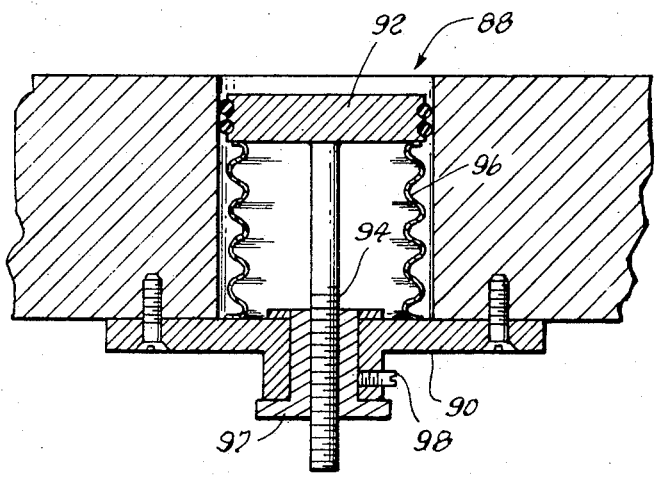
FIG. 4 is an alternate volume adjustment for use in with the embodiment shown in FIG. 2.

In FIG. 4 there is shown on an enlarged scale an alternative volume adjustment assembly 88 including a mounting flange 90, a piston 92 and a threaded rod 94 extending from the piston through threaded sleeve 97 rotatable in the flange 90 for adjusting the position of the piston relative to the flange, a bellows seal 96 secured to the piston and mounting flange, and a set screw 98 carried by the mounting flange for locking the sleeve 97 and thus the piston 92 in selected adjusted position. The bellows serves to prevent leakage between the ambient air and the gaseous substance in the detector. O-rings on the piston prevent interaction between the gas included in the back volume chambers of the detector and that between the outside surface of the bellows 96 and the surrounding surface. An advantage of this arrangement over that in FIG. 3 is that the bellows in FIG. 3 can vibrate when the detector is vibrated which would introduce some noise into the signal.

Obviously many modifications and variations of the present invention are possible in the light of the above teachings. It is therefore to be understood that within the scope of the appended claims the invention may be practiced otherwise than as specifically described.

I claim:

1. An infrared detector comprising:
   a housing;
   a gaseous substance in the housing having selected narrow band absorption spectra;
   a diaphragm that separates the gaseous substance into active and back volumes, that are to the same side of the diaphragm with the centroids of the volumes approximately coincident;
   an infrared window carried by the housing for transmitting energy within a selected band to the active volume; and
   diaphragm deflection detection means carried by the housing.

2. An infrared detector as defined in claim 1 wherein:
   the housing includes another volume joined by a fluid passage to the back volume; and
   a volume adjustment bellows means in said another volume.

3. An infrared detector as defined in claim 2 wherein said back volume comprises a plurality of pockets distributed about the active volume.